H. M. BOYD.
AXLE DRIVE.
APPLICATION FILED NOV. 2, 1916.
1,268,208.
Patented June 4, 1918.
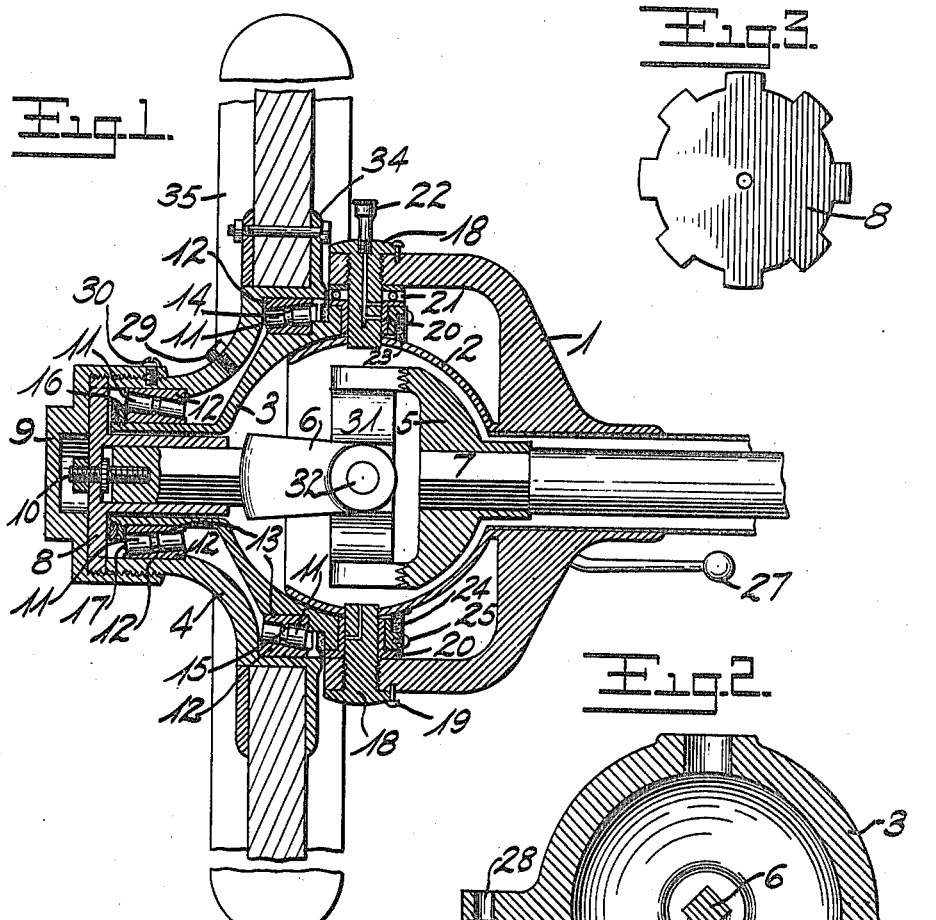
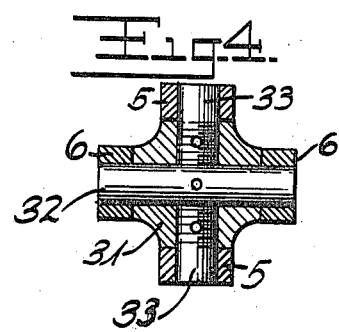
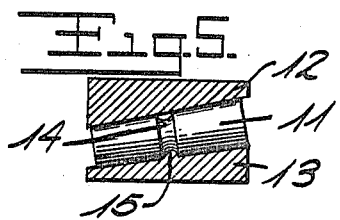
Inventor
Harry M. Boyd.
Attorneys Burger & Clarke.

UNITED STATES PATENT OFFICE.

HARRY MELVIN BOYD, OF FORT MYERS, FLORIDA.

AXLE-DRIVE.

1,268,208.　　　　Specification of Letters Patent.　　Patented June 4, 1918.

Application filed November 2, 1916. Serial No. 129,070.

*To all whom it may concern:*

Be it known that I, HARRY M. BOYD, a citizen of the United States, residing at Fort Myers, in the county of Lee and State of Florida, have invented a new and useful Improvement in Axle-Drives, of which the following is a specification.

The invention herein relates to apparatus for enabling power to be applied to the front wheels of motor vehicles for the purpose of causing such front wheels to assist in propelling the vehicle, as well as steer the same.

My primary object is to provide an apparatus of the kind mentioned which can readily be mounted on an automobile, truck, or the like; which comprises parts that can be easily assembled and adjusted, and which will be efficient, durable and practical in operation.

This and other objects and advantages will appear from the following description taken in connection with the drawings, which illustrate a preferred embodiment of my invention. This disclosure, however, is to be taken as explanatory only, and embodiments other than that actually shown, involving changes in structural details, may be utilized to the full extent indicated by the general meanings of the terms in which the claims are expressed.

On the drawings:

Figure 1 is a sectional view of my apparatus.

Fig. 2 is a sectional view of a part of the same.

Figs. 3, 4 and 5 are views of details.

The same numerals of reference identify the same parts throughout.

The invention herein described is an improvement upon that set forth in my patent on an axle-drive No. 1,078,032, granted to me November 11, 1913.

I show at 1 a yoke adapted to be fixed to one of the front axles on the frame or chassis of the vehicle; and having between the arms thereof an integral globular member 2. This yoke will be secured so that the arms thereof will be vertically disposed, one above the other; and opposite the member 2, between said arms is a journal or spindle member 3, shown in section on Fig. 2, having a globular portion which receives and engages said member 2 and constitutes therewith a jointed housing. This spindle member is received by the hub 4, carrying the wheel to be driven; and the globular member 2 and globular portion of the spindle member 3 incase a universal joint consisting of parts 5 and 6; the former rigid with a drive shaft 7, extending through the adjacent front axle and the yoke 1 thereon; and the latter being connected to a disk or flange 8 having projections on its rim, as best shown in Fig. 3, to engage recesses in the hub 4. This hub contracts outwardly from the wheel and is threaded at its outer end to receive a cap 9, which covers the flange 8. This flange has a round or cylindrical boss that extends into the small end of the spindle member 3, projecting from the globular portion thereof, and is free to rotate in same; and this boss has a polygonal bore to receive a short polygonal or square shaft attached to the part 6 of the universal joint, and be turned thereby. A bolt 10, engaging threads in the end of this shaft, extends through the flange 8, the bolt having a collar that abuts against the inner face of the flange adjacent the end of the shaft, and on the outer end this bolt is threaded to carry a nut which screws tight against the outer face of the disk.

I arrange anti-friction bearings between the hub 4 and spindle member 3; these bearings comprising conical rolling elements 11, disposed in the enlarged end of the hub adjacent the spokes and likewise in the contracted outer end of the hub. For this purpose I place rings 12 in the two ends of the hub 4, these rings providing bearing surfaces which contract toward each other; that is, the inner surface of the ring at the left in Fig. 1 contracts toward the right or large end of the hub, while the inner surface of the other ring contracts toward the small end of the hub. Similar bearing rings 13 are carried by the spindle member or journal 3 on both the globular portion and the part adjacent the flange 8. The outer surfaces of these rings also contract from the opposite ends of the hub inward and the rings 12 and 13 are so designed that they will be separated by contracting spaces and thus fit the elements 11 snugly. These elements may each have a circumferential groove 14 near the middle to be engaged by annular ribs 15 on the bearing rings, and prevented thereby from getting out of true position. It is to be noted that by arranging the rolling elements so that the axes of those at the large end of the hub converge toward the axis of the hub, while the axes of those at the small end of the hub also converge toward the axis of the hub, but in the opposite direction, the hub will automatically assume and constantly maintain its proper relation to the journal or spindle member 3, and any tendency of the hub to side play, axially, on the spindle member, is eliminated. The end of the globular portion of the journal may be flanged and provided with packing to engage the adjacent bearing rings and rollers, while at its other end the journal will be threaded to receive retaining nuts 16, over a washer 17, which engages the other bearing rings and rollers.

To connect the wheel to the yoke, I locate pivot pins 18 in the upper and lower arms of the yoke to engage the globular portion of the journal 3 and member 2. The globular member is received in the journal, and the pins 18 pass inward through both and are secured against turning by lock screws 19. The pins 18 are, of course, smooth at their inner ends, and they are each encircled by a bushing 20. I make these bushings with flanges, and the lower bushing has its flange engaging the lower arm of the yoke, while between the flange on the other bushing and the adjacent yoke arm is an anti-friction bearing 21, which takes the thrust due to the weight of the chassis. On the outer end of the upper pin is a grease cup 22, and this pin has a passage or duct leading therefrom, and having lateral ports to supply lubricant to both the inside of the bushing on the upper pin and the thrust bearing; while the lower pin has a similar duct leading through its inner end and having a lateral port opening inside the lower bushing for the same purpose. As will be understood, enough oil will collect inside the member 2 which, with the spindle 3, does not revolve with the hub and wheel, to take care of the lower pin 18, and this oil will run through the duct therein because this duct is at the lowest point of the inside surface of the member 2.

I employ packing 23 between the globular portion of the spindle member and the member 3, and hold same in place by a ring 24, in two semi-circular sections, fastened by screws 25.

The globular portion of the journal 3 has an opening 26, Fig. 2, to receive a steering arm 27, shaped so that it will not be interfered with by the axles when actuated, and an opening 28 to receive the connecting rod between the two front wheels. An aperture in the hub closed by a screw plug 29 enables lubricant to be admitted to the hub, and a screw 30 secures the cap 9 to the hub 4 over the flange 8.

As shown in Fig. 4, the parts 5 and 6 of the universal joint are secured together by a block 31, having a smooth bore therethrough to receive a pin 32. This pin projects from the block 31 at both its ends, and the part 6 is pivoted thereon. The block 31 also has alined threaded bores, at right angles to the bore for the pin 32, and communicating therewith, to receive threaded pins 33; to which is pivoted the part 5. I can screw the pins 33 into tight contact with the pin 32, to keep the latter in place, and I may also use rivets, indicated in Fig. 4, to engage the pins 32 and 33 and serve as locking elements therefor, after the universal joint is assembled.

The spokes of the wheel, which radiate outward from the hub, are secured to the larger end of the hub against a back flange 34 on the same. To take the spokes out, a ring 35, secured to the flange 34 by bolts, is dismounted by unscrewing the bolts.

The bolt 10 is adjusted in the short shaft connected to the part 6, so that the collar on this bolt, abutting against the flange 8, will hold the universal joint with its center in line with the axes of the pins 18, and the bolt 10 is locked in this position by the nut covered by the cap 9.

The above described construction may be employed on both front wheels of an automobile or truck to assist the rear wheels in driving, without interfering with the steering. The apparatus prevents skidding, gives longer life to the tires, puts less strain on the working parts, makes the car ride more easily, climb over obstacles and out of holes and depressions from a standstill, and run at much higher speed over wet, muddy and rough roads than cars driven from only the rear axles.

Obviously, with my invention the driving may be done through the front wheels of a car exclusively, and great pulling power thus obtained, if desired.

Having described my invention, what I believe to be new and desire to secure and protect by Letters Patent of the United States is:

1. A wheel having a hub, a universally jointed axle having a squared portion within said hub, a jointed axle housing having a reduced portion journaled within the hub, a disk having a squared socket fitted over the squared axle housing, a bolt screwed into the end of the axle and extending through the disk, a collar on the bolt between the disk and axle end, a nut screwed on the bolt against the disk, and a cap covering the nut and disk and screwed to the disk and hub.

2. A wheel having a hub, a universally jointed axle fixed to the hub, an axle housing having a vertical yoke and inner and outer globular joint sections within the yoke, vertical flanged bushings in the outer globular joint section, pivot pins passing through the yoke arms, the bushings and the inner globular joint section, and anti-friction bearings between the bushing flanges and the yoke arms.

HARRY MELVIN BOYD.